United States Patent
Kumar et al.

(10) Patent No.: US 11,303,320 B2
(45) Date of Patent: Apr. 12, 2022

(54) SAMPLER IN A FULL-DUPLEX SYSTEM AND METHOD OF SAMPLING RECEIVED SIGNAL

(71) Applicant: Indian Institute of Technology Madras (IIT Madras), Chennai (IN)

(72) Inventors: Abhishek Kumar, Chennai (IN); Sankaran Aniruddhan, Chennai (IN); Radha Krishna Ganti, Chennai (IN)

(73) Assignee: Indian Institute of Technology, Madras (IITM), Chennai (IN)

( * ) Notice: Subject to any disclaimer, the term of this patent is extended or adjusted under 35 U.S.C. 154(b) by 30 days.

(21) Appl. No.: 16/968,828

(22) PCT Filed: Mar. 14, 2019

(86) PCT No.: PCT/IN2019/050204
§ 371 (c)(1),
(2) Date: Aug. 10, 2020

(87) PCT Pub. No.: WO2019/175898
PCT Pub. Date: Sep. 19, 2019

(65) Prior Publication Data
US 2021/0006284 A1 Jan. 7, 2021

(30) Foreign Application Priority Data

Mar. 14, 2018 (IN) .............................. 201841009355

(51) Int. Cl.
*H04B 1/52* (2015.01)
*H04B 17/12* (2015.01)
*H04L 5/14* (2006.01)

(52) U.S. Cl.
CPC ............... *H04B 1/52* (2013.01); *H04B 17/12* (2015.01); *H04L 5/14* (2013.01)

(58) Field of Classification Search
CPC .............. H04B 1/52; H04B 17/12; H04L 5/14
USPC ..................................................... 375/262
See application file for complete search history.

(56) References Cited

U.S. PATENT DOCUMENTS

| | | | |
|---|---|---|---|
| 6,363,129 B1* | 3/2002 | Agazzi ............... | G01R 31/3004 331/2 |
| 2002/0061081 A1* | 5/2002 | Richards .................. | H04B 1/69 375/346 |

* cited by examiner

*Primary Examiner* — Fitwi Y Hailegiorgis (57) ABSTRACT

According to the embodiment discloses a method providing direct RF sampling of the received signal in a full duplex system. A sampler in the full-duplex system comprises a buffer to clip an amplitude information from each of a coupled transmitter (Tx) signal and a voltage at an antenna port of the sampler for obtaining a buffered transmitter signal and a buffered voltage at the antenna port. Phase detector in the sampler is configured to perform sampling of time delay between the buffered transmitter signal and the voltage at the antenna port and generate an output. The sampler further comprises current integrator configured to pass the output of the phase detector for generating a sampled output, wherein the sampled output generates an output received signal.

20 Claims, 5 Drawing Sheets

SAMPLER IN A FULL-DUPLEX SYSTEM AND METHOD OF SAMPLING RECEIVED SIGNAL

FIELD OF INVENTION

The present invention relates to a full-duplex receiver, and more particularly to a sampler in the full-duplex receiver. The present application is based on, and claims priority from an Indian Application Number 201841009355 filed on 14 Mar. 2018, and PCT/IN2019/050204 filed on 14 Mar. 2019 the disclosure of which is hereby incorporated by reference the disclosure of which is hereby incorporated by reference herein.

BACKGROUND

A rapid increase in traffic under limited Radio Frequency (RF) resources have resulted in development of full-duplex systems. The full-duplex systems use same RF resources for transmitting information. However, full-duplex systems are associated with self-interference from a transmitter (Tx) to a receiver (Rx) during a simultaneous transmit-receive operation in wireless communication systems.

The problem of self-interference becomes even more significant in same-channel full-duplex transceivers. Currently, most of fully integrated self-interference cancellation techniques for high power systems are based on electrical balance. However, the high-power systems generally suffer from a tight trade-off between Tx and Rx path insertion loss.

Due to a presence of magnetic components, an implementation of self-interference cancellation techniques results in a large chip area and a narrowband operation. It may also be shown that a time selective sampling may be used to recover a received RF signal in presence of strong interfering signals. Even though the time selective sampling seems useful, direct sampling of the received RF signal poses implementation challenge due to each of charge injection, clock feed through and signal feed-through. Further, in case of narrowband carrier modulated signals, designing a sampler with tracking bandwidth greater than the carrier frequency is very challenging.

OBJECT OF INVENTION

The principal object of the embodiments herein is to provide sampler in a full-duplex system.

Another object of the invention is to direct sample a received RF signal in presence of a strong self-interference from a transmitter signal.

Another object of the invention is to sample the received RF signal at Tx zero-crossings to eliminate the Tx signal.

SUMMARY

Accordingly, embodiment discloses a sampler in a full-duplex system. The sampler comprises a buffer configured to clip an amplitude information from each of a coupled transmitter (Tx) signal and a voltage at an antenna port of the sampler for obtaining each of a buffered transmitter signal and a buffered voltage at the antenna port. The sampler further comprises a phase detector configured to perform sampling of time delay between the buffered transmitter signal and the voltage at the antenna port and generate an output. The sampler further comprises a current integrator configured to pass the output of the phase detector for generating a sampled output. The sampled output generates an output received signal.

Accordingly, discloses a method for sampling received signal in a full-duplex transceiver system. The method comprises configuring a buffer to clip an amplitude information from each of a coupled transmitter (Tx) signal and a voltage at an antenna port of a sampler, for obtaining each of a buffered transmitter signal and a buffered voltage at the antenna port. The method further comprises performing, through a phase detector, sampling of time delay between the buffered transmitter signal and the voltage at the antenna port and generate an output. The method further comprises passing, to a current integrator, the output of the phase detector for generating a sampled output, wherein the sampled output generates an output received signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This sampler and method are illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Proposed description provides a sampler and a method providing a time selective sampling capable of eliminating a strong interference signal without requiring a high linearity receiver frontend. The proposed method may be used to implement a full-duplex transceiver front-end by sampling a received Radio Frequency (RF) signal at zero-crossings of a strong transmitting signal. The sampler is proposed to directly sample the received RF signal at an antenna port by exploiting an implicit voltage-to-delay conversion occurring in a full-duplex system.

The sampler is proposed for direct sampling of the received RF signal in the presence of a strong self-interference from the transmitting signal. The received RF signal is sampled at Tx zero-crossings to eliminate the Tx signal. The sampling is achieved by exploiting the implicit voltage-to-delay conversion happening at the antenna port. A complete knowledge of the Tx signal allows recovering the received RF signal samples. Further, an open-loop architecture of the sampler enables wide-bandwidth operation.

Referring now to the drawings, and more particularly to FIGS. 1 through 8, where similar reference characters denote corresponding features consistently throughout the figures, there are shown preferred embodiments.

Figure 1:
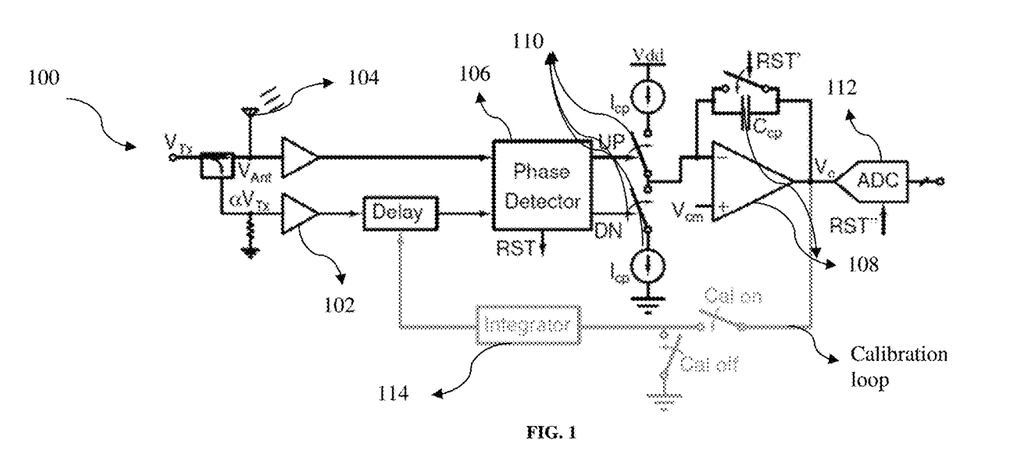
FIG. 1 illustrates a block diagram of a sampler at a Tx zero-crossing, according to the embodiments as disclosed herein.

In accordance with an embodiment, FIG. 1 illustrates a block diagram of a sampler 100 in a full-duplex system. The sampler 100 comprises a buffer 102 configured to clip an amplitude information from each of a coupled transmitter (Tx) signal and a voltage at an antenna port 104 of the sampler 100 for obtaining each of a buffered transmitter signal and a buffered voltage at the antenna port 102.

The sampler 100 further comprises a phase detector 106 configured to perform sampling of time delay between the buffered transmitter signal and the voltage at the antenna port 104 and generate an output. The sampler 100 further comprises a current integrator 108 configured to pass the output of the phase detector 106 for generating a sampled output. The sampled output generates an output received signal.

Further details of the sampler 100 will now be explained. The sampler 100 further comprises each of the phase detector 106, a charge pump 110 (including UP, DN switches and $I_{cp}$ current in FIG. 1), the current integrator 108 (including $C_{cp}$ in FIG. 1). Analog to Digital converter 112 digitizes output of the sampler 100. The phase detector 106 is configured to perform the time delay sampling for performing the sampling of the received signal. The time delay sampling comprises clipping the amplitude information from each of the received signal (Tx signal) by passing through the buffer 102. The clipping is performed while preserving relative zero crossing time instants in the zero crossing time instants.

The phase detector 106 is configured for determining a delay for the time delay sampling of the received signal and generates an output of the phase detector 106. The phase detector 106 comprises a tri-state phase detector.

The output of the phase detector 106 is passed through the charge pump 110. An output of the charge pump 110 is passed through the current integrator 108 for generating each of a reset pulse and a sampling clock. An output received signal is generated after digitizing through the ADC 112 according to the reset pulse and the sampling clock.

Still referring to FIG. 1, let each of transmitted voltage signal (Tx) and a received voltage signal (Rx) be given by:

$$V_{Tx}(t) = A_{Tx}(t) \sin\{\omega t + \phi_{Tx}(t)\} \quad (1)$$

$$V_{Rx}(t) = A_{Rx}(t) \sin\{\omega t + \phi_{Rx}(t) + \phi\} \quad (2)$$

where $\phi$ is a phase difference between transmit carrier and receive carrier. Zero crossing time instants of $V_{Tx}(t)$ may be determined as:

$$V_{Tx}(t) = 0$$

$\sin\{\omega t + \phi_{Tx}(t)\} = 0$, ignoring the case $A_{Tx}(t) = 0$ $$\omega t + \phi_{Tx}(t) = \pi k$$

where k is an integer. For only rising edge, $$\omega t + \phi_{Tx}(t) = 2\pi k \quad (3)$$

If $V_{ex}(t)$ is sampled at time instants, $t = t_k$ given by (3), then $V_{Rx}(t_k)$, sampled output is obtained as:

$$V_{Rx}(t_k) = A_{Rx}(t_k) \sin\{\omega t_k + \phi_{Rx}(t_k) + \phi\} \quad (4)$$
$$= A_{Rx}(t_k) \sin(\omega t_k + \phi_{Tx}(t_k) + \phi_R(t_k) - \phi_{Tx}(t_k) + \phi)$$
$$= A_{Rx}(t_k) \sin\{\phi_{Rx}(t_k) - \phi_{Tx}(t_k) + \phi\}$$

As seen from equation (4), bandwidth of the sampled output will be higher than original received signal $V_{Rx}(t)$. Presence of phase modulation, $\phi_{Tx}(t)$, in $V_{Tx}(t)$ makes the sampling process non-uniform. Using (4) and with knowledge of $V_{Tx}(t)$, the received signal may be reconstructed. Number of samples required to achieve particular error vector magnitude (EVM) value depends on interferer strength and type of modulation.

The sampler 100 is configured at a sampling frequency equal to at-least twice a signal bandwidth and a tracking bandwidth greater than a maximum signal frequency. The sampler 100 uses the delay sampling approach for performing the sampling of the received signal.

Voltage to delay conversion: In a full-duplex system transceiver's front-end, the antenna port 104 is shared between the transmitter (Tx) and a receiver (Rx), and power of the transmitted signal is much higher than the power of the received signal. In a full-duplex transceiver system, net voltage at the antenna port 104 is $$V_{Ant}(t) = V_{Tx}(t) + V_{Rx}(t) \quad (5)$$

From equation (5), slope of $V_{Tx}(t)$ at zero crossing time instants $t = t_k$ is given by $$S_{Tx}(t_k) = \frac{d}{dt}[A_{Tx}(t)\sin\{\omega t + \phi_{Tx}(t)\}]\bigg|_{t_k} \quad (6)$$
$$= A_{Tx}(t_k)\omega$$

From equation (6), $A_{Tx}(t)$ and $\phi_{Tx}(t)$ are assumed to have a maximum frequency content much smaller than the carrier frequency ω. Due to the presence of $V_{Rx}(t)$, zero crossing instants of $V_{Ant}(t)$ get shifted with respect to the $V_{Tx}(t)$ by the following amount:

$$\Delta t(t_k) = \frac{V_{Rs}(t_k)}{S_{Tx}(t_k)} \quad (7)$$

$$V_{Rx}(t_k) = \Delta t(t_k) \times A_{Tx}(t_k)\omega, \text{ using (6)}$$

Further, the $V_{Rx}(t)$ may be calculated by using the time delay $\Delta t(t_k)$.

Delay sampling performed by the phase detector 106 of the sampler 100: Each of the coupled Tx signal, $\alpha V_{Tx}$, (where α is a fraction value less than to provide coupling of small part of the Tx signal) and the voltage at the antenna port 104, $V_{Ant}$, are passed through the buffer 102 (plurality of buffers 102) configured to clip the amplitude information of the each of the antenna port 104 and the Tx signal while preserving relative zero crossing time instants. A delay offset between each of the $V_{Ant}(t)$ and the $V_{Tx}(t)$ is nulled using a calibration loop (shown in grey area in FIG. 1). The calibration loop comprises a calibration loop integrator 114 (or simply integrator).

The delay between the buffered $V_{Ant}(t)$ and $V_{Tx}(t)$ is determined using the tristate phase detector used as the phase detector 106. The output of the phase detector 106 is passed through the charge pump 110 followed by the current integrator 108. The current integrator 108 is reset before a next sampling instant. A reset signal (RST) from the phase detector 106 is used to generate a reset pulse (RST') for the current integrator 108 and the sampling clock (RST") for a succeeding digitizer (ADC 112, also referred digitizer). An expression for the sampled output is given below in equation (8):

$$V_o(k) = \frac{I_{cp}}{A_{Tx}(t_k)\omega C_{cp}} V_{Rx}(t_k) \quad (8)$$

where $I_{cp}$ is a charge pump current and $C_{cp}$ is an integrator capacitance.

A low bandwidth calibration loop (shown in grey portion in FIG. 1) is added to reduce the delay offset between each of the $V_{Ant}(t)$ and the $V_{Tx}(t)$. A return-to-zero output of the sampler $V_o$ is integrated and fed to a control voltage of a voltage-controlled delay line. Once calibrated, a relative delay between each of direct paths and coupled paths is relatively slow to change, so a switch is added in front of the current integrator 108 to enable an operation of the calibration loop. The calibration loop may be turned after a delay offset is nulled. The calibration loop integrator 114 stores a required voltage for the voltage-controlled delay line in the absence of an input.

Figure 2A:
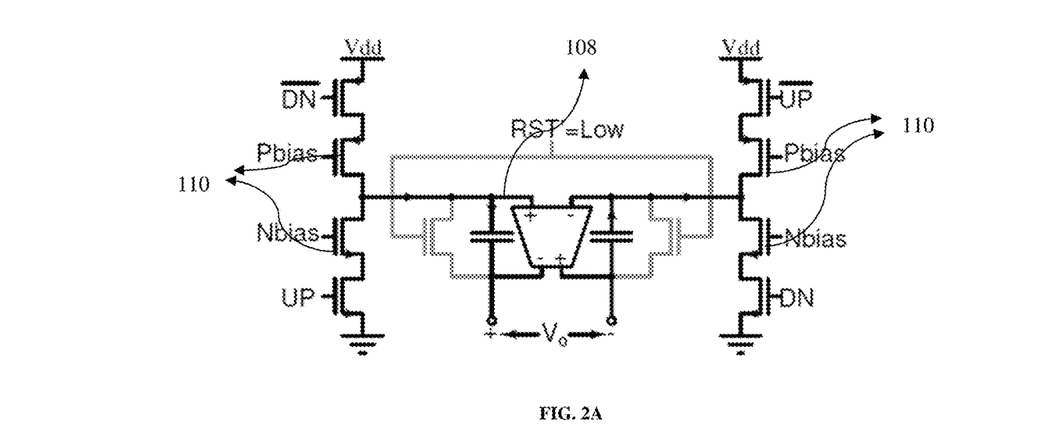
FIG. 2A illustrates a circuit of a differential charge-pump with an integrator in the sampler, where a Reset Pulse (RST') is low, according to the embodiments as disclosed herein.

FIG. 2A illustrates a circuit of the differential charge-pump 110 with the current integrator 108, where the RST' is low, according to the embodiments as disclosed herein. The proposed sampler 100 is implemented in a 65 nm CMOS process with 1.2V supply.

Each of the antenna port 102 and Tx coupled signals of the sampler 100 may be buffered by using self-biased inverters. The antenna port 102 comprises an AC coupled antenna. In the implementation of the sampler 100 as shown in FIG. 2A, an amplitude information of each of the antenna signal and Tx signal will be lost and only relative zero crossing information is retained. The self-biased inverters provide a current-starved inverter-based delay line to match path delays between the antenna port 104 and the coupled Tx signal paths during a calibration phase provided by the calibration loop.

A modified TSPC phase detector is used as the phase detector 106 for a high-speed operation. The differential charge pump (charge pump 110) in the sampler 100 is implemented to avoid the offset due to mismatch between up and down currents. An output current of the charge pump 110 is processed by a differential active integrator (used as the current integrator 108), when the RST' is low.

Figure 2B:
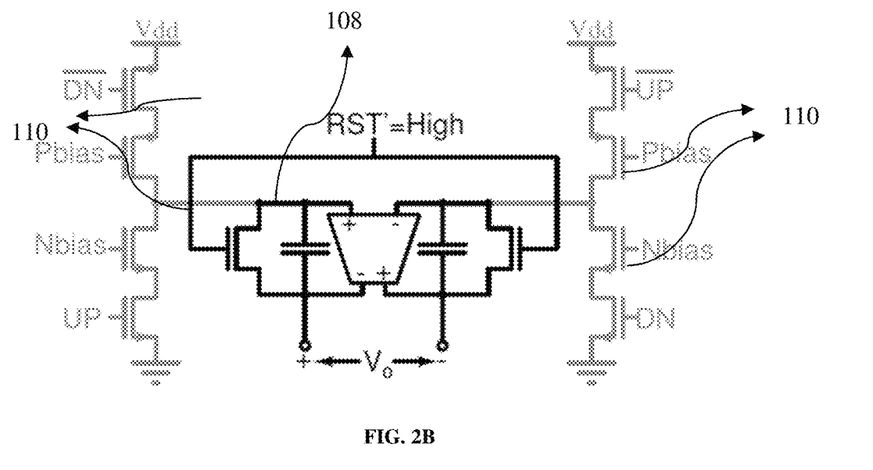
FIG. 2B illustrates a circuit of the differential charge-pump with the integrator, where the RST' is high, according to the embodiments as disclosed herein.

FIG. 2B illustrates a circuit of the charge pump 106 (also referred as a differential charge-pump) with the current integrator 108, configured in the sampler 100, where the RST' is high, according to the embodiments as disclosed herein. When the reset pulse is generated by the phase detector 106, the charge pump 110 is turned off and RST' goes high. During the turning off the charge pump 110, the integrating capacitors (not shown in Fig.) are discharged and the output of the sampler 100 becomes zero. Also, in the reset phase, the self-biased inverters of the OTA get self-biased and self-bias voltage of the self-biased inverter sets the output common-mode of the charge pump 110.

The charge pump 110 current is chosen equal to 1 mA and the integrating capacitor is kept 100 fF. The OTA is designed to give transconductance of 125 mS.

Figure 3:
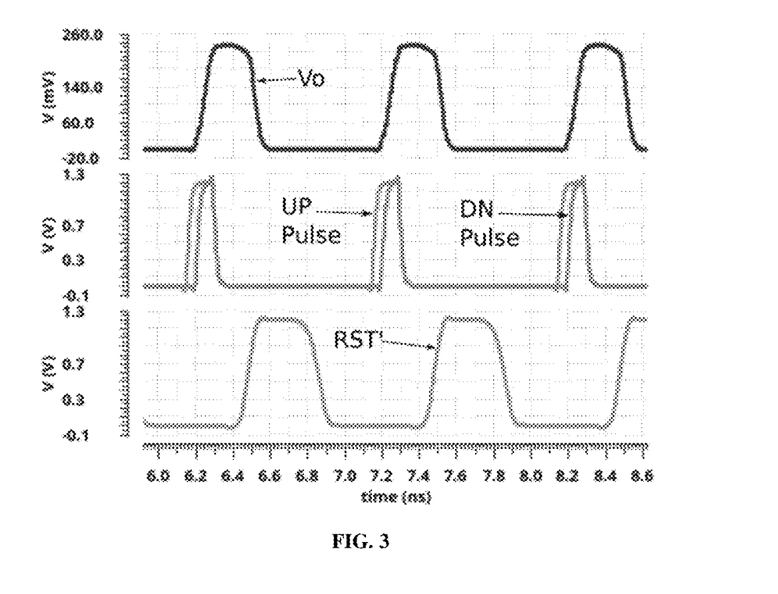
FIG. 3 illustrates a transient simulation outputs of the sampler, according to the embodiments as disclosed herein.

In accordance with an embodiment, referring to FIG. 3, one or more transient simulation outputs of the sampler 100 are shown. The sampler 100 is designed and simulated by using a Cadence SpectreRF software. The transient simulation outputs are shown when delay between the $V_{Ant}$ and the coupled $V_{Tx}$ is 50 ps at a 1 GHz carrier frequency. The output voltage Vo starts rising only when the UP pulse has arrived, thereby converting the time difference between the UP and DN (down) pulses into the voltage domain. The transient simulation output corresponds to the sampled value of the received signal at the zero crossing of VTx. Output of the current integrator 108 becomes zero as soon as RST' goes high.

Figure 4:
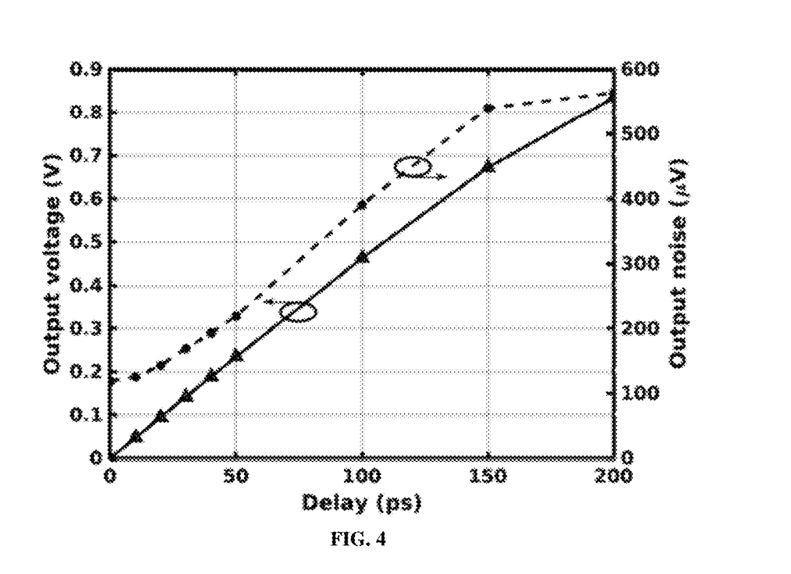
FIG. 4 is a graphical diagram illustrates a output voltage and an integrated output noise versus delay between a $V_{Ant}$ and a coupled $V_{Tx}$, according to the embodiments as disclosed herein.

FIG. 4 is a graphical diagram illustrates the output voltage and the integrated output noise versus delay between the $V_{Ant}$ and the coupled $V_{Tx}$, according to the embodiments as disclosed herein. The output voltage and the output noise for different delay between the $V_{Ant}$ and the coupled $V_{Tx}$ at 1 GHz carrier frequency is shown in the FIG. 4. The output voltage varies linearly with the delay until the integrator OTA starts compressing. A 1 dB compression point occurs around the delay of 192 ps. The output noise is obtained by the integrating noise from 100 kHz to 10 MHz. A larger delay keeps the charge pump 106 in ON state for a longer period of time, resulting in an increased output noise.

Figure 5:
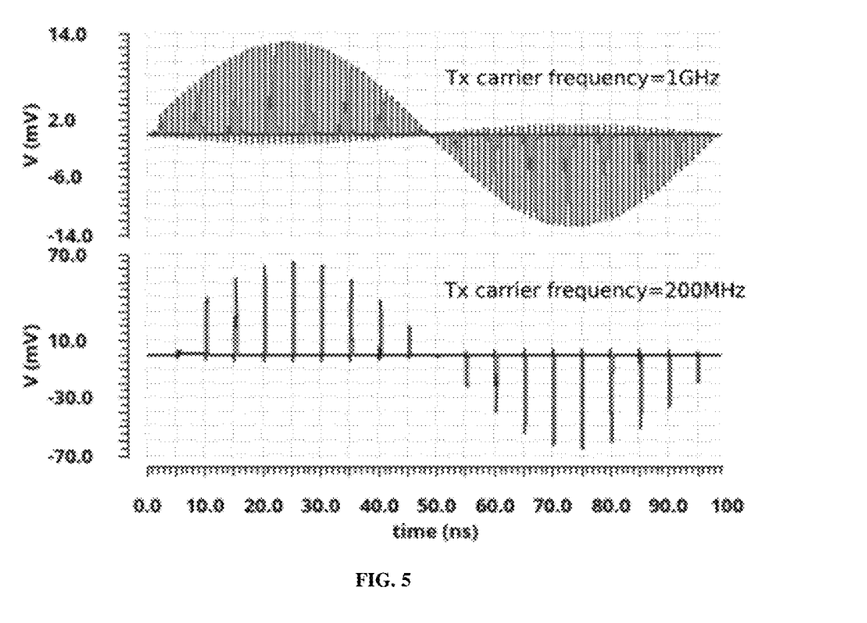
FIG. 5 is a transient simulation of a received signal in the presence of a $V_{Tx}$ signal, according to the embodiments as disclosed herein.

FIG. 5 is a transient simulation of the received signal in the presence of $V_{Tx}$ signal, according to the embodiments as disclosed herein. The output voltage waveform when the received signal is 10 mV in the presence of a 0.6V $V_{Tx}$ signal is shown in the FIG. 5. Let the received signal frequency is set to 10 MHz, higher than the Tx carrier frequency in each of the cases. As evident from simulation results, a reduction in the carrier frequency results in reduced the sampling rate as well as increases the output voltage. From (8), the output voltage is expected to be inversely proportional to the carrier frequency.

Figure 6:
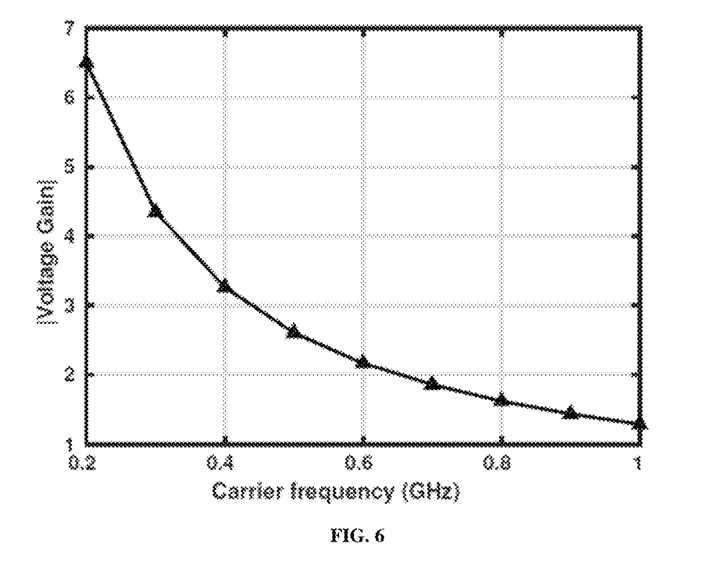
FIG. 6 is a graphical diagram illustrating a received signal gain variation with a carrier frequency in the presence of a Tx signal, according to the embodiments as disclosed herein.

FIG. 6 is a graphical diagram illustrating the received signal gain variation with the carrier frequency in the presence of the Tx signal, according to the embodiments as disclosed herein. The Tx signal is 0.6V. The magnitude of the voltage gain drops to almost unity at 1 GHz. The minimum carrier frequency of operation for the proposed sampler is limited by a leakage at dynamic nodes in the circuit.

On the other hand, a speed of the phase detector 106 and the reset time of the current integrator 108 set a maximum allowed carrier frequency. In the current implementation, the sampler 100 works satisfactorily between 200 MHz and 1 GHz. The output noise of the sampler 100 integrated between 100 kHz to 10 MHz at a 1 GHz carrier frequency is equal to 118.7 µV. A gain of 1.29 in the presence of a 0.6V Tx signal at 1 GHz is shown in the FIG. 6. Therefore, sensitivity of the sampler at 1 GHz in the presence of a 0.6V Tx signal is equal to (11.8.7/1.29) µV=92 µV=−67 dBm (50 reference impedance). The total power consumed by the sampler circuit from a 1.2V supply is 33.2 mW.

Figure 7:
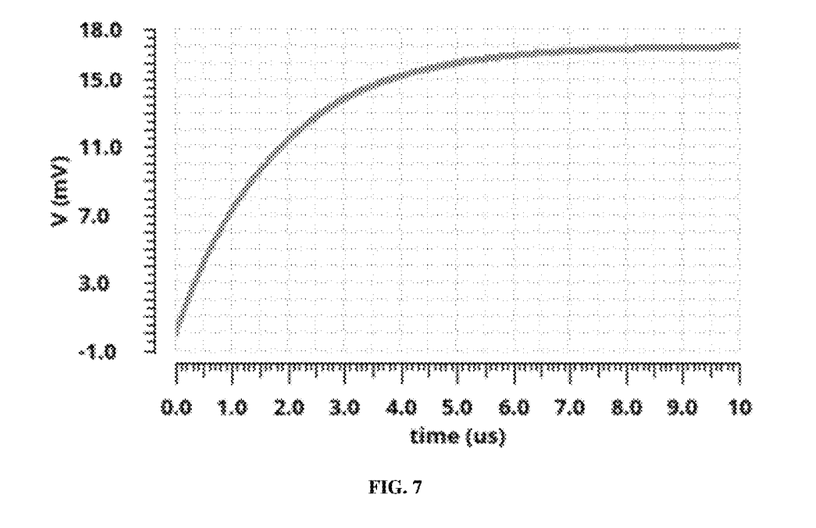
FIG. 7 is a graphical diagram illustrating a delay line control voltage waveform during a calibration phase, according to the embodiments as disclosed herein.

FIG. 7 is a graphical diagram illustrating the delay line control voltage waveform during the calibration phase, according to the embodiments as disclosed herein. To verify the calibration, a 10 ps delay is introduced between the antenna port 104 and the coupled Tx paths. It takes around 10 µs for the calibration loop to null this delay offset.

Figure 8:
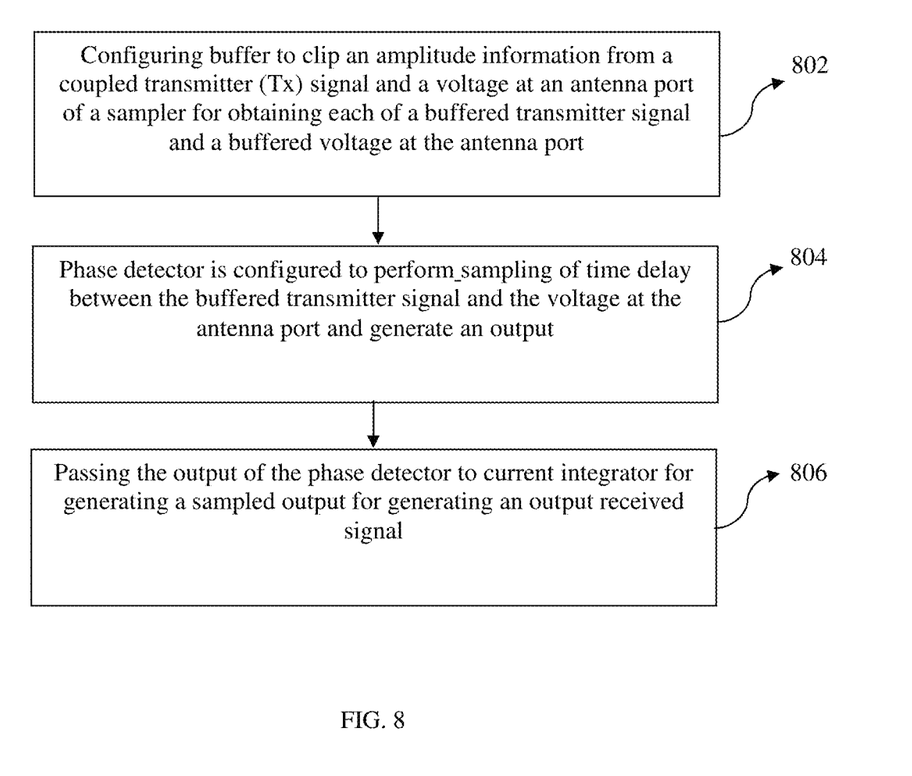
FIG. 8 shows a method for sampling received signal in a full-duplex system, according to the embodiments as disclosed herein.

In accordance with an alternate embodiment, referring to FIG. 8, a method 800 for sampling received signal in a full-duplex transceiver system is shown. The method 800 may be executed by the sampler 100 as discussed above.

At step 802, the method 800 provides configuration of a buffer to clip an amplitude information from each of a coupled transmitter (Tx) signal and a voltage at an antenna port of a sampler for obtaining each of a buffered transmitter signal and a buffered voltage at the antenna port (102). The buffer comprises the buffer 102 of FIG. 1, and the antenna port comprises the antenna port 104 of FIG. 1

At step 804, the method 800 provides sampling of time delay between the buffered transmitter signal and the voltage at the antenna port. The sampling is performed through a phase detector for generating an output. The phase detector comprises the phase detector 106 of FIG. 1.

At step 806, the method 800 provides passing the output of the phase detector to a current integrator for generating a sampled output. The sampled output generates an output received signal. The current integrator comprises the current integrator 108 of FIG. 1.

Details of the method 800 are similar to details of the sampler 100 as discussed above and hence are not repeated for the sake of brevity.

The proposed sampler 100 is designed in a 65 nm CMOS process, and operates up to a carrier frequency of 1 GHz. Simulations show that the receiver displays a sensitivity of −67 dBm at 1 GHz in presence of a 5.5 dBm Tx signal for 10 MHz sampled signal bandwidth while consuming 33.2 mW. A breakdown voltage of input buffer devices decides a maximum Tx power which can be tolerated by the sampler. A highly digital nature of the proposed sampler 100, along with the absence of magnetic components, will greatly benefit from technology scaling.

Same channel full-duplex communication can potentially double the throughput in the same bandwidth. Self-interference from transmitter (Tx) is the major issue in a full-duplex transceiver. Proposed sampler 100 provides self-interference cancellation time selective sampling at Tx zero crossing.

Unlike conventional solutions, the proposed sampler 100 may be used for the time selective sampling capable of eliminating the strong interference signal without requiring the high linearity receiver front-end.

Further, the proposed sampler 100 may be used to directly sample the received RF signal at the antenna port 102 by exploiting the implicit voltage-to-delay conversion occurring in the full-duplex system.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A sampler (100) in a full-duplex transceiver system, the sampler (100) comprising:
   a buffer (102), configured to clip an amplitude information from each of a coupled transmitter (Tx) signal and a voltage at an antenna port (104) of the sampler (100), for obtaining each of a buffered transmitter signal and a buffered voltage at the antenna port (104);
   a phase detector (106), configured to perform sampling of time delay between the buffered transmitter signal and the voltage at the antenna port (104) and generate an output; and
   a current integrator (108), configured to pass the output of the phase detector (106) for generating a sampled output, wherein the sampled output generates an output received signal.

2. The sampler as claimed in claim 1, wherein the phase detector is configured to:
   perform sampling of time delay between the buffered transmitter signal and the voltage at the antenna port at radio-frequency by using a conversion method, wherein the sampling comprises a time delay sampling.

3. The sampler as claimed in claim 2, wherein the conversion method comprises a voltage-to-delay conversion method.

4. The sampler as claimed in claim 1, comprising:
   a charge pump configured to:
     control an offset due to a mismatch between up and down currents and generate an output current; and
     pass the output current to the current integrator for generating the sampled output.

5. The sampler as claimed in claim 4, wherein the charge pump is configured to be turned off when a reset signal generated by the phase detector is high.

6. The sampler as claimed in claim 1, wherein the current integrator is configured to be reset before each sampling instant performed by the phase detector, and wherein a reset signal from the phase detector generates a reset pulse for the current integrator.

7. The sampler as claimed in claim 1, comprising:
   an Analog to Digital Converter (ADC) configured to digitize the sampled output for generating the output received signal.

8. The sampler as claimed in claim 1, comprising:
   a calibration loop, configured to control a delay offset between each of the transmitter (Tx) signal and the voltage at the antenna port; and a switch added to the current integrator to enable an operation of the calibration loop.

9. The sampler as claimed in claim 8, wherein the calibration loop comprises a calibration loop integrator configured to store a voltage required for providing a voltage-controlled delay line while controlling the delay offset.

10. The sampler as claimed in claim 1, comprising:
one or more self-biased inverters configured to provide a current-starved inverter-based delay line to match path delays between each of the antenna port and the coupled Tx signal paths during a calibration phase enabled by a calibration loop.

11. The sampler as claimed in claim 4, comprising:
one or more self-biased inverters configured to provide a current-starved inverter-based delay line to match path delays between each of the antenna port and the coupled Tx signal paths during a calibration phase enabled by a calibration loop.

12. A method for sampling received signal in a full-duplex transceiver system, the method comprising:
configuring, a buffer, to clip an amplitude information from each of a coupled transmitter (Tx) signal and a voltage at an antenna port (104) of a sampler (100), for obtaining each of a buffered transmitter signal and a buffered voltage at the antenna port (104);
performing, through a phase detector (106), sampling of time delay between the buffered transmitter signal and the voltage at the antenna port (104) and generate an output; and
passing, to a current integrator (108), the output of the phase detector (106) for generating a sampled output, wherein the sampled output generates an output received signal.

13. The method as claimed in claim 12, wherein the performing comprises:
sampling of time delay between the buffered transmitter signal and the voltage at the antenna port at radio-frequency by using a conversion method, wherein the sampling comprises a time delay sampling.

14. The method as claimed in claim 13, wherein the conversion method comprises a voltage-to-delay conversion method.

15. The method as claimed in claim 12, comprising:
controlling, through a charge pump, an offset due to a mismatch between up and down currents and generate an output current; and
passing the output current to the current integrator for generating the sampled output.

16. The method as claimed in claim 12, wherein the passing comprises:
resetting, the current integrator, before each sampling instant performed by the phase detector, and wherein a reset signal from the phase detector generates a reset pulse for the current integrator.

17. The method as claimed in claim 12, comprising:
configuring, an Analog to Digital Converter (ADC) to digitize the sampled output for generating the output received signal.

18. The method as claimed in claim 12, comprising:
configuring, a calibration loop, to control a delay offset between each of the transmitter (Tx) signal and the voltage at the antenna port; and
adding, a switch to the current integrator to enable an operation of the calibration loop.

19. The method as claimed in claim 18, comprising:
configuring, one or more self-biased inverters to provide a current-starved inverter-based delay line to match path delays between each of the antenna port and the coupled Tx signal paths during a calibration phase enabled by the calibration loop.

20. The method as claimed in claim 12, comprising:
configuring, one or more self-biased inverters to provide a current-starved inverter-based delay line to match path delays between each of the antenna port and the coupled Tx signal paths during a calibration phase enabled by a calibration loop.

* * * * *